United States Patent [19]

Cohen et al.

[11] E Re. 30,479

[45] Reissued Jan. 13, 1981

[54] METHOD OF REMOVING PARTICLES AND FLUIDS FROM A GAS STREAM BY CHARGED DROPLETS

[75] Inventors: Ernest Cohen, Palos Verdes Estates; Marshall N. Huberman, Los Angeles, both of Calif.; Walter Krieve, deceased, late of Rancho Palos Verdes, Calif.; by Bernice C. Krieve, heir; by Christine A. Krieve, heir, both of Los Angeles, Calif.; Charles W. Lear, Los Angeles, Calif.

[73] Assignee: TRW Inc., Redondo Beach, Calif.

[21] Appl. No.: 906,727

[22] Filed: May 17, 1978

Related U.S. Patent Documents

Reissue of:

[64] Patent No.: 3,958,959
Issued: May 25, 1976
Appl. No.: 495,013
Filed: Aug. 5, 1974

U.S. Applications:

[63] Continuation-in-part of Ser. No. 303,017, Nov. 2, 1972, abandoned, which is a continuation-in-part of Ser. No. 61,224, Aug. 5, 1970, abandoned.

[51] Int. Cl.[3] ..... B03C 3/16
[52] U.S. Cl. ..... 55/10; 55/107
[58] Field of Search ..... 55/10, 107, 122

[56] References Cited

U.S. PATENT DOCUMENTS

| | | | |
|---|---|---|---|
| 1,958,406 | 5/1934 | Darrah | 55/107 |
| 2,207,576 | 7/1940 | Brown | 55/10 |
| 2,357,354 | 9/1944 | Penney | 55/107 |
| 2,525,347 | 10/1950 | Gilman | 55/10 |
| 3,016,979 | 1/1962 | Schmid | 55/10 |
| 3,503,704 | 3/1970 | Marks | 55/107 |
| 3,520,662 | 7/1970 | Marks | 55/10 |
| 3,656,171 | 4/1972 | Robertson | 239/15 |

FOREIGN PATENT DOCUMENTS

| | | | |
|---|---|---|---|
| 2139300 | 2/1972 | Fed. Rep. of Germany | 55/122 |
| 5051 | of 1914 | United Kingdom | 55/122 |
| 421811 | 12/1934 | United Kingdom | 55/10 |

OTHER PUBLICATIONS

Hendricks et al.-Photomicrography of Electrically Sprayed Heavy Particles, AIAA Journal, vol. 2, No. 4, 1964, pp. 733-737.

Peskin et al.-Drop Size from Liquid Jet in Longitudinal Electric Field, AIAA Journal, (1964), vol. 2, No. 4, pp. 781-782.

*Primary Examiner*—Norman Yudkoff
*Attorney, Agent, or Firm*—Andra M. Finkel; John J. Connors

[57] ABSTRACT

A method for the removal of particulate matter as well as noxious gases and vapors from a gas stream. This is accomplished by means of charged droplets having a size between 60 and 250 microns and preferably between 80 and 120 microns. The droplets are generated by first ejecting a stable jet of liquid such as water. The liquid jet is broken up into charged droplets by applying an electric potential between the jet and the collecting walls of the scrubber. Since most gases are electronegative the droplets are preferably charged positively by the resultant electrostatic field. However, in case some of the particles are already charged it is preferred to generate charged droplets having a polarity which is the same as that of the particles. The method works well with particles having a diameter of approximately 0.01 micron or more and the droplets are preferably moved at an angle to the direction of movement of the gas stream to increase the relative velocity between the droplets and the particles. The droplets may include a chemical agent which chemically reacts with an undesirable fluid in the gas stream to remove it. The collector wall may be sprayed to flush particulate matter which may have been collected by the wall.

13 Claims, 13 Drawing Figures

METHOD OF REMOVING PARTICLES AND FLUIDS FROM A GAS STREAM BY CHARGED DROPLETS

Matter enclosed in heavy brackets [ ] appears in the original patent but forms no part of this reissue specification; matter printed in italics indicates the additions made by reissue.

CROSS REFERENCE TO RELATED APPLICATIONS

The present application is a continuation-in-part of our copending application, Ser. No. 303,017 filed on Nov. 2, 1972 now abandoned which in turn is a continuation-in-part of an original application, Ser. No. 61,224 filed Aug. 4, 1970, copending with application Ser. No. 303,017 and now abandoned.

BACKGROUND OF THE INVENTION

This invention relates generally to a method of collecting or removing particles such as dust or smoke and other pollutants from a gas stream and particularly relates to a method of removing either particles or fluids from a gas stream by means of charged droplets.

Due to the increasing concern for ecology, it has become necessary to provide devices or methods for removing dust, smoke, and other fluid or solid pollutants from an air stream or smoke stack. Among such devices are electrostatic precipitators and so-called wet scrubbers.

The oldest and most common industrial precipitator is the basic Cottrell electrostatic precipitator. Here a corona discharge is passed through the space through which the gas stream flows. Accordingly, the particles in the gas stream are electrically charged by the accumulation of ions. The charged partices are subsequently attracted to collector plates where they are deposited and eventually removed. This electrostatic precipitator normally removes pollutant particles in the range from 0.1 to 10 micron diameter having a resistivity of $10^6$ to $10^{12}$ ohms-cm. Since the charge of the particle is caused by ions, the magnitude of the charge is limited because the number of ions is limited by the electrostatic field.

A number of design modifications have been attempted to effect an improved collection eficiency. One such device is exemplified by U.S. Pat. No. 1,958,406 issued to Darrah, which suggests the desirability of producing a fine spray of small diameter droplets. The apparatus to Darrah is characterized by a ring-shaped conductor or electrode positioned near a fluid discharge nozzle. This conductor is frequently referred to as an extractor plate. The purpose of an extractor plate is to impart an electrostatic charge to the fluid droplets and enhance the velocity thereof. The droplets are ejected under pressure from the fluid nozzle.

Other typical art devices are shown in the U.S. Pat. to Penney, Nos. 2,357,354 and 2,357,355 and Marks, No. 3,503,704. As is typical of most prior art devices, Penney and Marks also use an extractor electrode or electrodes which induce a charge on the droplets. A further characteristic of these devices is the fact that the charged droplets and particulates are carried downstream where the driving mechanism toward the wall electrodes is the space charge effect and relatively weak associated field which cause the droplets to move toward the walls.

A further characteristic of the prior art devices utilizing an extrctor plate is the introduction of droplets at high velocity followed by a decrease in velocity as the droplet traverses the gas medium. This will occur since the electrostatic field is between the fluid nozzles and extractor electrode and the charged particles tend to return upstream along the flux lines; however, the gas stream carries them downstream. This variation in sweep rate of the droplet tends to produce a variation in the cleansing qualities from one region of the gas stream to another, and in general provides for a relatively slow sweep rate and small differences in relative velocities between the droplets and the particulates.

The British Pat. No. 5051 issued on Feb. 26, 1914 discloses a wet scrubber using a counter current flow of the gas stream and the droplets. The droplets are generated by a series of jets for producing a fine water spray. The gas flows through a vertical tube and therefore the water jets are also disposed in a circular arrangement. The water is charged negatively and the walls positively. The droplets are sprayed under pressure. Furthermore, the droplets in the interior of the water jets are shielded by the outer jets from the electrostatic field. This patent, therefore, fails to teach the generation of small size droplets by electrohydrodynamic action.

A paper by Hendricks, Jr. et al. entitled "Photomicrography of Electrically Sprayed Heavy Particles" which appears in the Journal of the American Institute of Aeronautic and Astronautics, Volume 2, No. 4, April 1964, pages 733–737 deals with electrostatic thrust devices for space flight. It is proposed in the paper to generate liquid drops by the application of an electrostatic field. However, the liquid is ejected into a vacuum where conditions are totally different from those where a liquid is ejected into the atmosphere. Thus in the first place the space charge surrounding a capillary is vastly different for vacuum conditions than for atmospheric pressure. Additionally, it has been found by extensive test and research that the motion and dispersal of charged droplets under vacuum conditions discussed in the Hendricks Jr. et al. paper cannot be extrapolated with useful results under atmospheric conditions. It is also indicated that spraying of the liquid will occur around the periphery of the capillary through which the liquid is ejected.

The U.S. Pat. to Gilman, No. 2,525,347 also discloses an electrostatic apparatus where liquid droplets are generated. Here the gas stream which flows in the same direction as the droplets in initially ionized by an ionizing wire. This, of course, will charge the particles carried by the gas stream.

The liquid is sprayed out of a tube or nozzle and the droplets are accelerated by a ring electrode or extractor plate which is maintained positive while the nozzle and the walls are maintained at ground potential. Normally the droplets would be accelerated and collected by the extractor electrode. In order to avoid this it is either necessary to force the droplets to flow at such a velocity that they are carried past the extractor electrode or else to use a gas stream of sufficient velocity to prevent the droplets from being collected by the ring electrode. This, of course, imposes a severe restriction on the parameters of the charged spray apparatus. It will also be noted that there is zero relative motion between the particles of the gas stream and the droplets. The arrangement produces two separate electrostatic fields, one between the nozzle and the extractor electrode and the second between the extractor electrode and the walls of the scrubber. Due to the arrangement of the two electrostatic fields, the droplets must traverse a longer path before they encounter the walls.

Still another representative of the prior art is the German Pat. No. 2628822, issued July 25, 1913. Therein is disclosed a tube having pin holes through which water issues in a stream which breaks up into a fog-like rain of droplets. High voltage applied to the droplets will charge the droplets which are attracted to collection plates having an opposite charge. A device of this type provides little control over the droplet size and does not provide for a maximum charge density on the droplet. Little or no attention is given to controlling the operating parameters to yield a highly efficient scrubber.

It is accordingly an object of the present invention to provide a method of removing particles and undesirable fluids from a gas stream which is characterized by greater performance efficiency and which requires less energy than prior art methods.

A further object of the invention is to provide a method of the type discussed which will remove particles within a wide range of sizes by the simple adjustment of the operating parameters such as droplet size, magnitude of the elctrostatic field and the like.

Another object of the present invention is to provide a method for removing particles from a gas stream in which the removal efficiency is substantially independent of the resistivity of the particles.

Still a further object of the invention is to form droplets by electrohydrodynamic action without requiring a special extractor plate.

SUMMARY OF THE INVENTION

The method of the present invention will remove from a gas stream undesirable fluid components and particulate matter entrained thereby. The gas stream flows between spaced elements or walls and a spray tube is disposed between the elements. Thus the gas stream is caused to flow between the elements and past the spray tube. A liquid such as water is forced through the spray tube into the gas stream at substantially atmospheric pressure to generate a liquid jet. A steady electric potential is applied between the liquid jet or the spray tube and the spaced walls. This will cause the liquid jet to break up into individual droplets due to the electrohydrodynamic action of the resultant electrostatic field. The droplets have a diameter between approximately 60 microns and approximately 250 microns and each droplet has a high surface charge density which approaches the Rayleigh limit, as will be explained hereinafter. More specifically, the droplet diameter may be on the order of between 80 and 120 microns.

The charged droplets are caused to flow toward the walls at an angle with respect to the direction of the flow of the gas stream to provide a relative velocity between the gas stream and the droplets. As a result, the droplets collide with individual particles or undesirable fluids to remove them. Eventually, the droplets are caused to move toward the walls due to the electrostatic field, where they collide and collect.

The liquid may be doped with or may contain a chemical agent which reacts with an undesirable gas. This may, for example, consist of sodium hydroxide to remove sulfur dioxide.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
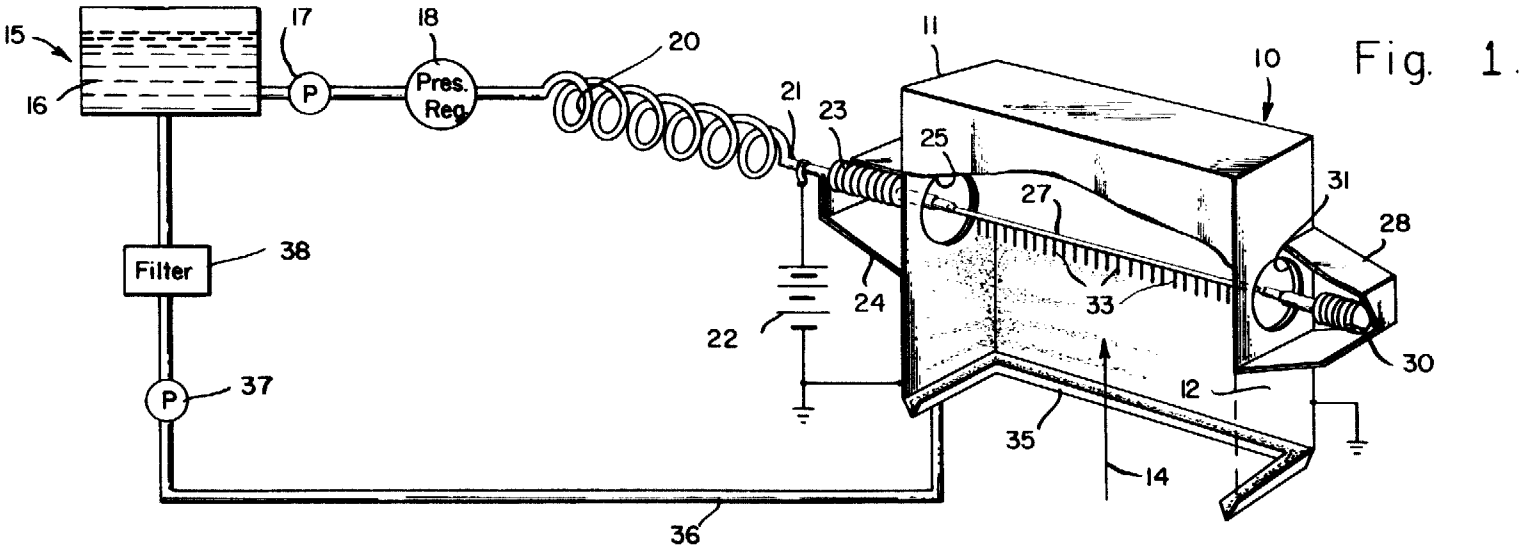
FIG. 1 is a schematic showing, partly in perspective, of a charged droplet scrubber suitable for practicing the method of the present invention.
Figure 2:
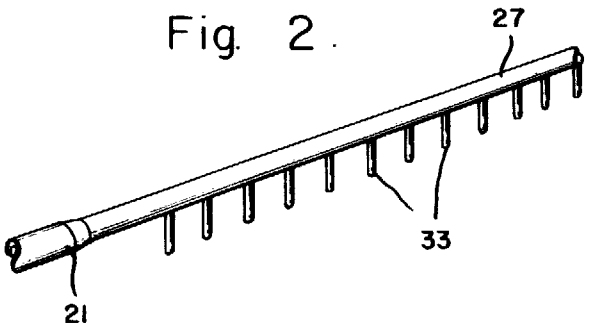
FIG. 2 is a view in perspective of a support tube from which depend a plurality of spray tubes for generating liquid jets to be used in the method of the present invention.

Referring now to FIGS. 1 and 2, there is illustrated, by way of example, a charged droplet scrubber for practicing the method of the present invention. The scrubber includes a conduit 10 having spaced walls 11 and 12 through which a gas stream is caused to flow. The gas stream may move, for example, in an upward direction as shown by arrow 14. The pressure in the conduit 10 will generally be approximately atmospheric. The gas stream may entrain particulate matter such as dust particles and the like which are to be removed from the gas stream in accordance with the present invention. The gas stream may also include undesirable fluid components such as other gases or condensate matter which also is to be removed. The gas stream may, for example, originate from an asphalt plant or an industrial pulp and paper manufacturing installation. The scrubber shown schematically at 10 may form part of the stack of the plant.

In accordance with the method of the present invention the undesirable fluids and particulate matter are removed by charged droplets. The droplets may, for example, consist of water. In some cases it may be desirable to add to the water chemical agents which will react with the gas components to be removed. Such chemical agents may, for example, consist of sodium hydroxide to remove sulphur dioxide.

To this end there may be provided a liquid reservoir 15 containing a liquid 16. The liquid may be passed through a pump 17 and a pressure regulator 18 whereby the liquid pressure may be precisely controlled. Preferably, the liquid is then passed through an insulating pipe 20 which may be wound in helical fashion as shown to increase its resistance without increasing its physical size. The purpose is to electrically insulate the reservoir 15 from the high voltage. The liquid then continues through a conductive pipe 21 which may be positively charged by a direct current voltage source 22 shown schematically as a battery having its negative pole grounded.

An insulator 23 serves to insulate the positive voltage on the pipe 21 from the walls 11 and 12 which, as shown, are grounded. The insulator 23 may be mounted on a housing extension 24 and the pipe may be passed through an aperture or circular opening 25 in the wall 11.

The pipe 21 passes between the walls 11 and 12 and forms a support tube 27. The other end of the support tube 27 is mounted by an insulator 28 in a housing extension 30. The support pipe 27 extends through the wall 12 through an aperture 31. Depending from the support tube 27 are a plurailty of spray tubes 33 which are closely spaced from each other and each of which generates a jet of liquid. The pressure of the liquid is such that the liquid flows through each spray tube at a velocity greater than that due to gravity. This will ensure that a continuous, steady water jet is formed. On the other hand, the hydrostatic pressure should be insufficient to break up the jet by itself into a droplet spray.

The droplets are generated electrohydrodynamically, that is under the influence of the electric field existing between the positively charged support tube 27 and the spray tubes 33 on the one hand, and the grounded walls 11 and 12 on the other hand. The fluid is supplied at a rate low enough to prevent any hydraulically formed droplets, i.e., the supply tubes do not act as spray nozzles. The formation and spraying of the droplets results from electrostatic forces only.

This electrostatic field should be high enough to generate charged droplets having a high surface density charge, that is a charge which may even approach the Rayleigh limit, as will be subsequently explained.

The thus formed droplets are accelerated by the electrostatic field and flow though the gas stream where they tend to be decelerated by viscous drag. However, the acceleration caused by electrostatic force tends to overcome this effect and eventually the droplets may approach a constant velocity. There will be an angle between the direction of movement of the droplets and that of the gas stream. This causes a relative velocity between the droplets and the particles to be collected. A high relative velocity results in a high pollutant removal efficiency. Eventually, the droplets are attracted by the walls 11 and 12 where they collide and collect.

The thus formed slurry may be collected in a trough 35 at the bottom of the walls 11 and 12. This slurry may be moved through a conduit 36 by means of a pump 37 back into the liquid reservoir 15. A filter 38 may be interposed into the conduit 36 to remove the paticulate matter.

Figure 4:
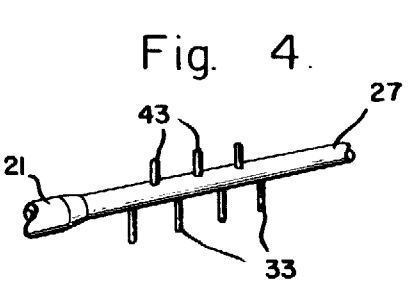
FIG. 4 is a view in perspective of a portion of a support tube provided with spray tubes extending from opposite sides thereof.
Figure 3:
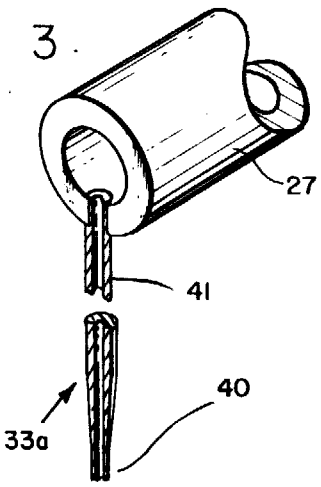
FIG. 3 is a cross-sectional view on enlarged scale of an exemplary spray tube and a portion of its support tube and which may be used for generating a liquid jet.

As shown by way of example in FIG. 3, each of the spray tubes such as 33a may have an end portion 40 with reduced wall thickness. The thicker wall of the upper portion 41 of the spray tube facilitates brazing of the spray tube to its support tube 27 as shown. On the other hand the smaller wall thickness of the end portion 40 is usually desired to enhance the electrostatic field. In some cases it may be necessary to place the spray tubes 33 closer together than shown in FIG. 2. In this case a set of spray tubes 43 may be disposed opposite the set of spray tubes 33 as illustrated in FIG. 4. This also illustrates that it is not necessary that the water jets be directed downwardly.

Figure 5:
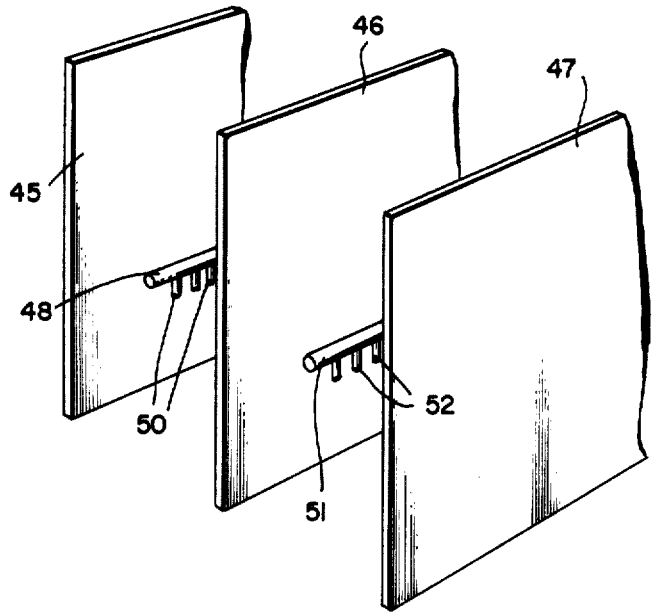
FIG. 5 is a view in perspective showing schematically a module array illustrating one way of operating a plurality of adjacent sets of droplets.

As shown in FIG. 5, it is feasible to provide a module array with successive adjacent collector walls such as 45, 46, and 47. In this case a support tube 48 with spray tubes 50 may be disposed between collector walls 45 and 46 while another support tube 51 with spray tubes 52 may be disposed betwen walls 46 and 47. Such an arrangement makes it possible to clean a larger gas stream because the gas stream may be broken up into two or more portions, each being cleaned by its own scrubber module.

Figure 6:
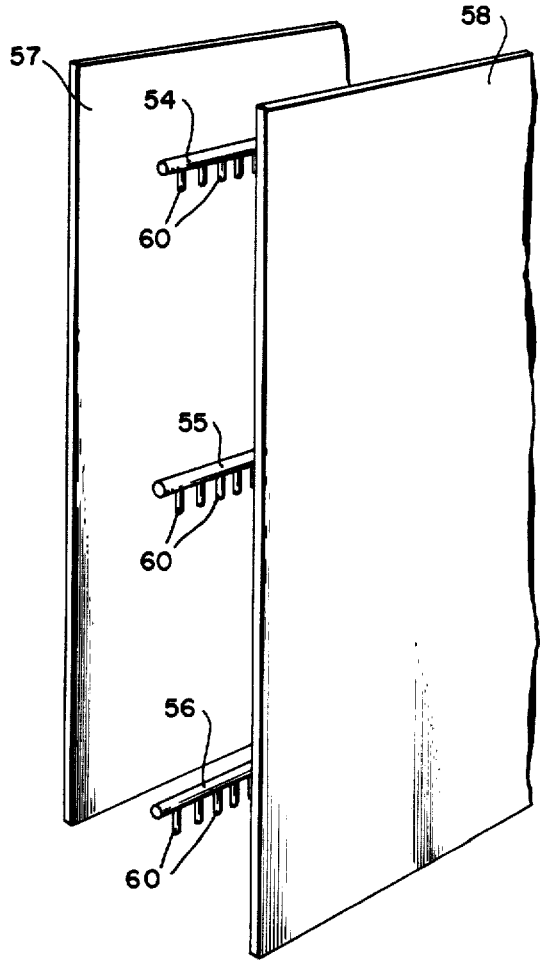
FIG. 6 is a view in perspective illustrating a stage array for utilizing a vertical set of charged droplets.

It is also feasible as illustrated in FIG. 6, to provide a series of support tubes such as 54, 55 and 56 disposed vertically with respect to each other between two collector walls 57 and 58. Each of these support tubes 54–56 will, of course, be provided again with a plurality of spray tubes as indicated at 60. This makes it possible to clean a gas stream by successive sets of droplets. In other words, each set of droplets can be made to clean successive portions of the gas stream contaminants to provide a higher overall contaminant removal efficiency.

More specifically, the arrangement of FIG. 5 makes it possible to maintain the gas flow velocity through the module at a predetermined range. Adjacent modules as shown in FIG. 5, share a common collector plate such as 46. The embodiment of FIG. 6 is particularly suitable where the particles to be removed include a wide range of sizes and it is desirable to adjust each vertical stage to a particular narrower range of sizes of the particle.

Figure 7:
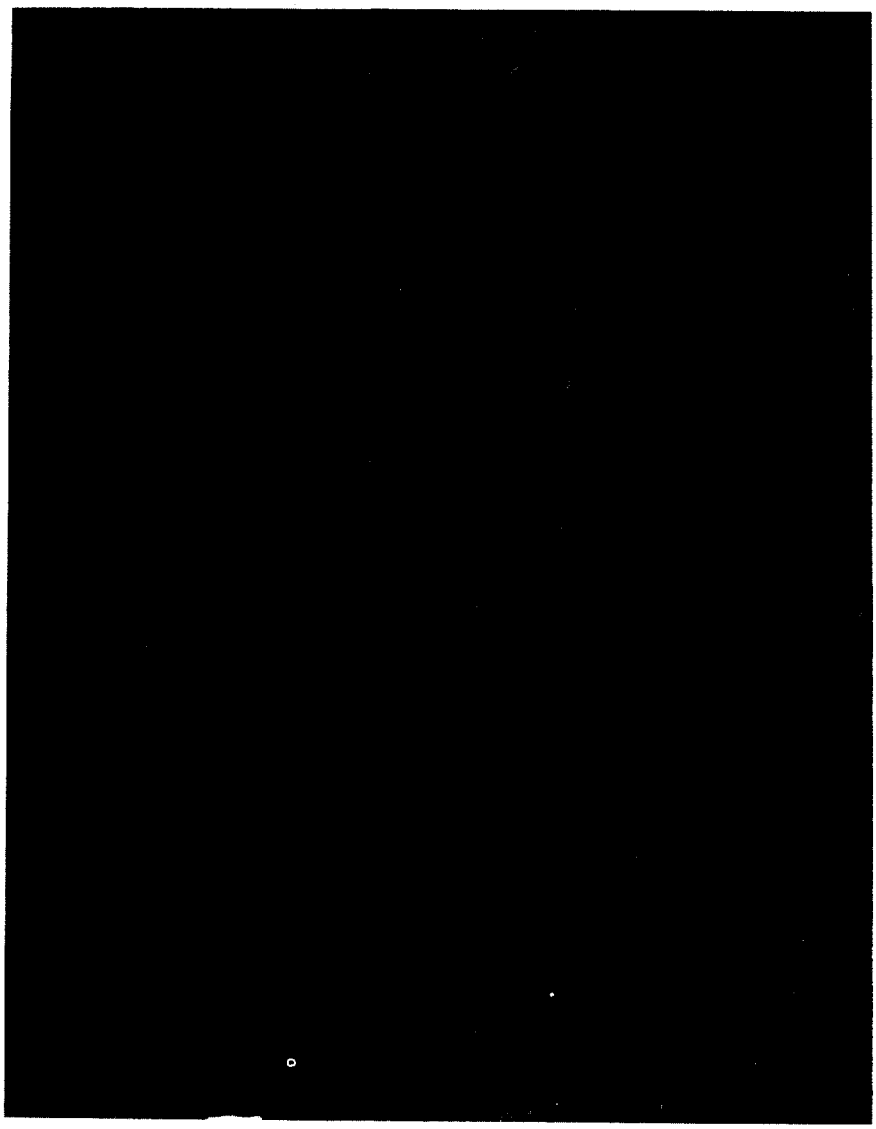
FIG. 7 is a photograph of a liquid jet showing how it is broken up into liquid droplets by the action of an electrostatic field.

Reference is now made to FIG. 7. This shows a photograph of a liquid spray issuing from a spray tube. It will be clearly seen in FIG. 7 that the liquid jet moves back and forth in an unpredictable manner due to variations of the local field strength and eventually breaks up into fine droplets. The liquid jet shown in the foreground which eventually becomes a series of droplets has separated from an initial jet stream and has remained there while a portion of the intervening jet has subsequently been broken up into droplets. The picture focuses on one of the spray tubes, the other two in the background being out of focus. The jet was obtained with a water head of 8 inches and through a spray tube of 22 gauge corresponding to an inner diameter of b 0.016 inches and an outer diameter of 0.032 inches.

In general it is preferred that the airflow indicated by arrow 14 in FIG. 1 be laminar. However, it should be noted that turbulent air flow does not impede the efficiency.

According to the method of the invention it is preferred that the particles to be removed have no electric charge. This will facilitate the removal of the particle by collision with the droplet because a neutral particle is neither repelled nor attracted by a charged droplet. If some of the particles have a charge opposite that of the droplet they will rapidly decrease the initially high surface charge density of the droplet and eventually neutralize the charge on the droplet. While a charged particle having a charge with a polarity equal to that of a droplet may collide with a droplet and hence be absorbed or engulfed, the charge on the particle does not increase the collision efficiency.

It should be noted that particles may also be removed by induced charging. This means that the electric charge on a droplet induces a charge on a particle which is close enough to accept the charge but which does not directly collide with the droplet. Such a charged particle will then be attracted by the collector walls such as 11 and 12 as previously explained.

In general, the gas stream will consist predominantly of electronegative gases. Electronegative gases such as $O_2$, $SO_2$, HF, $H_2O$ and $Cl_2$ will absorb electrons. Since they will acquire a negative polarity they cause high corona currents. For this reason it is generally preferred that the droplets have a positive polarity. As shown in FIG. 1, the positive pole of battery 22 is connected to the conductive tube 21.

In some cases some of the particles to be removed may already have an electric charge before they reach the charged droplet scrubber. This may be due to the origin of the particles or else they may acquire an electric charge by collision with the walls of the ducts. In this case the droplets preferably have a polarity which is the same as the polarity of the charge of the particles. If the droplets had a different polarity the particles would, of course, collect at the support tube 27 and spray tube 23 and would there accumulate. This accumulation of material would eventually be removed by corona discharge or arcing which is undesirable.

It will be realized that only some of the particles are electrically charged while the remainder are neutral. The neutral particles are collected by the charged droplets in the manner previously explained, that is by collision with a charged droplet. The charged particles on the other hand are directly attracted to the walls of the scrubber just as the charged droplets are attracted.

In general, the size of the droplets is between approximately 60 microns (1 micron being $10^{-6}$ meter) and 250 microns. A preferred range is between approximately 80 and approximately 120 microns. If the droplet size is too small, the velocity of the droplets is also small, thereby reducing the probability of collision with a particle.

Figure 10:
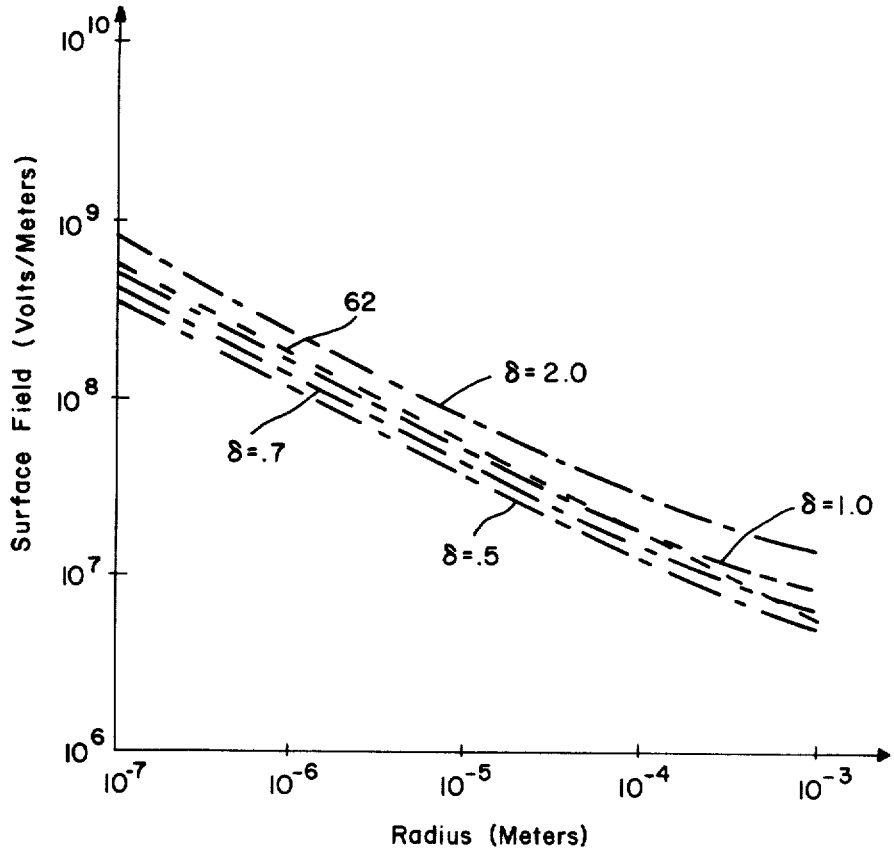
FIG. 10 is a family of curves showing the surface field in volts per meter as a function of the droplet radius in meters for different air densities and further showing the Rayleigh limit surface field.

On the other hand, the surface charge density may approach the Rayleigh limit. In this connection reference is made to FIG. 10 which plots the surface field of the droplets in volts per meter as a function of the droplet radius in meters. FIG. 10 shows a set of curves with different values of $\delta$ between 0.5 and 2.0 where $\delta$ is defined by $\delta=\rho/\rho_0$, $\rho$ being the actual air density and $\rho_0$ standard air density corresponding to one atmosphere pressure and 298° K. In other words, $\delta$ is the ratio of actual gas density to that of standard conditions.

The charge density of a droplet is limited by either the Rayleigh limit or the corona breakdown limit. The Rayleigh limit is calculated by the force balance between the electrostatic forces arising from the surface charge which tends to pull a droplet apart, and the surface tension forces. This may be expressed as follows:

$$q = 2\frac{\sigma\epsilon}{r} \tag{1}$$

where q is the surface charge density $\sigma$ is the liquid surface tension $\epsilon$ is the dielectric constant of the medium and r is the droplet radius.

If E is the droplet surface electrostatic field, it is given as follows:

$$E = \frac{q}{\epsilon} \tag{2}$$

Accordingly, in FIG. 10 curve 62 indicates the Rayleigh limit surface field on a water droplet. It will be noted that curve 62 intercepts the curve for $\delta=1.0$ and hence limits the droplet size at which the Rayleigh limit can be achieved in air at standard conditions.

In general, when the surface charge density of a droplet exceeds that given by equation (1) the droplet will separate into two or more portions. Since the surface area of the resulting portions is larger than that of the original droplet, each resulting portion will have a lower surface charge density. It should be noted from FIG. 10 that the surface field may be in excess of that for breakdown in normal air which is 3 megavolts per meter. However, this breakdown field is a function of the geometry of the droplet. As shown by FIG. 10, a droplet having a radius below approximately 34 microns (or 68 micron diameter) will generally exceed the corona field in air. Therefore smaller droplets tend to lose their excess charge by a corona process.

The electric voltage which may be applied by the battery 22 should in general be no more than 60 kv. This may correspond to an electric field on the order of 20 megavolts per meter on the liquid spray jets. It should be noted that the surface charge density of the droplets and subsequently on the particles obtained by the method of the invention may be between six times and forty times larger than that obtained by a conventional precipitator.

Figure 8:
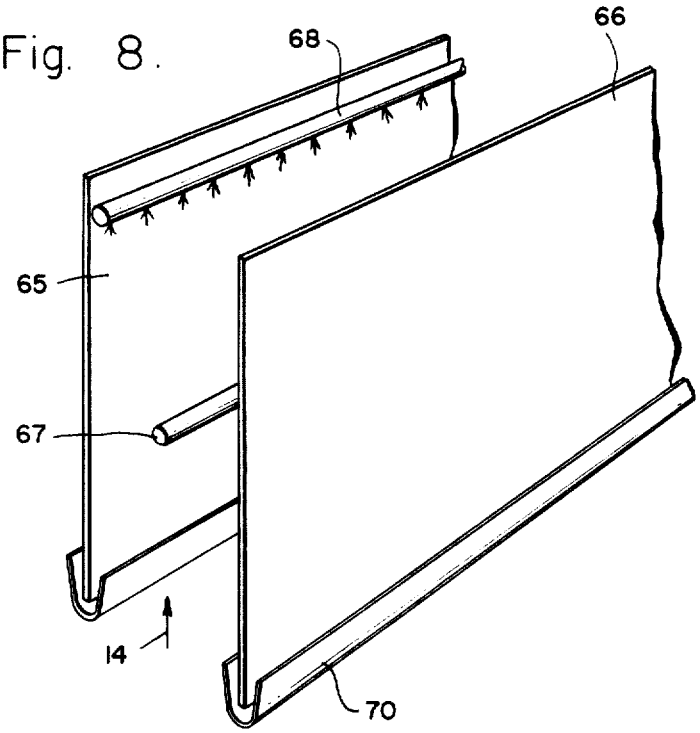
FIG. 8 is a view in perspective of a portion of a charged droplet scrubber provided with a wash tube and a collector trough for cleaning the collector plates.

As illustrated in FIG. 8, it may be desirable in some cases to make provision for washing down the collector plates. Thus in FIG. 8 there are shown two collector plates 65 and 66 between which may be disposed a support tube 67 from which depend again a plurality of spray tubes, not illustrated. A wash tube 68 may be disposed adjacent each of the walls 65 and 66. The wash fluid may be collected by a suitable trough shown at 70 and may then be fed back into the reservoir 15 as explained previously in connected with FIG. 1. Such a wash tube may be necessary or desirable where a large quantity of particulate matter is collected or where the particles are relatively large to form a slurry.

The method of the invention works well with particles having a diameter above approximately 0.01 microns. The upper limit of the particle size is simply given by the size of the particles capable of being entrained by the gas stream. The gas stream may, by way of example, move at a velocity between 5 and 15 feet per second.

The charge of a droplet may be calculated as follows:

$$ne = 4\pi r^2 \epsilon_0 E_0 \tag{3}$$

where n is the number of electron charges on the particle e is the charge of an electron r is again the radius of the particle $\epsilon_0$ is the dielectric constant of free space $E_0$ is the electrostatic breakdown field at the surface of the droplet in the medium surrounding the droplet.

It should also be noted the the droplet drift time is generally less than 25 milliseconds.

It will be realized that a charged droplet is capable of multiple collisions with particles. During successive collisions of this type one droplet may engulf several particles, one at a time.

The diameter of the support tube 27 should be of such a size that the electrostatic field at the surface of the tube is at the incipient value of the corona breakdown level in the absence of a space charge. The space charge, of course, is due to the charged droplets and the particles entrained by the gas flow. This means that in the presence of space charge the surface field of the support tube 27 is below that of normal corona breakdown. It should be noted that the presence of space charge will reduce the surface field by a factor of 2 or 3. Some typical operation parameters are as follows: The electrode voltage, that is the voltage between support tube 27 and walls 11 and 12 is 50 kv. The distance between the two walls 11 and 12 is 0.2 meter while $E_S$ which is the electrostatic field in the absence of space charge is in the range between 3.5 and 6.0 megavolts per meter. The diameter of the support tube 27 may be between 0.950 and 1.270 centimeter.

The electrostatic field at the tip of each spray tube must be maintained sufficiently high to accomplish droplet formation and charging. This should be accompained with a minimum of ion corna current because the ions will dilute the effect of the space charge due to the droplets.

The electric field should be so adjusted that with no liquid flow from the spray tubes there will be corona current from the spray tubes. This corona current will be higher than the actual operating current because the mobility of the ions is higher than that of a droplet.

With an electrode corresponding to that shown in FIGS. 1–3 the corona sheath diameter is approximately 3 to 4 times that of the tube tip. In this case, the support tube diameter was 0.950 centimeter. The spray tubes extended 4.1 centimeter from the center line of the support tube; the tips of the spray tubes had a diameter of 1.25 millimeter. The apparent field at the tips of the spray tubes was in excess of 10 megavolts per meter. The corona breakdown voltage is increased due to the radius of curvature of the electrode. This in turn makes possible the control of the size of the electrohydrodynamically sprayed droplets. The force balance on the liquid column is determined by the following equation:

$$2\pi\sigma S = \frac{\pi S^2 E_0 2_e}{2} \quad (4)$$

where S is the radius of the liquid column jets from which the droplets are formed.

The liquid jet radius may not be the same as that of the radius of the spray tube; nevertheless it is determined by the spray tube radius. From this it will be evident that the droplet size is controlled by the spray tube geometry and is a direct function of the spray tube diameter.

Figure 9:
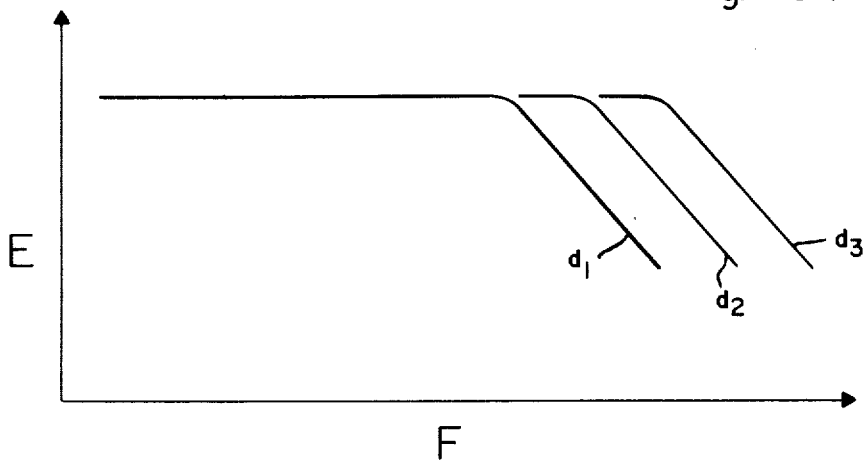
FIG. 9 is a family of curves illustrating the cleaning efficiency as a function of the particulate loading factor for different inner diameters of the spray tubes.

In this connection reference is made to FIG. 9. Here E represents the cleaning efficiency and F the particulate loading factor or density, $d_1$, $d_2$, $d_3$ represent increasing values of the inside diameter of the spray tube. This shows that the efficiency of any particular size spray tube is substantially constant over a given range of loading conditions. An increase in the load factor beyond this range results in decreased efficiency. It will be apparent that it is desirable to select a spray tube having the smallest inner diameter which still yields maximum efficiency.

The desired spacing of the spray tubes may be determined in the following manner. The maximum spacing is based on obtaining the best distribution of liquid flow. On the other hand the minimum spacing is determined from the electrostatic screening effect of adjacent tubes. By way of example, with a half width between walls 11 and 12 of 0.1 meter, an operating voltage of 50 kv and a support tube diameter of 9.5 millimeter the spray tube outer diameter may be 1.25 millimeter and the inner diameter 0.89 millimeter. For these conditions the maximum spacing between spray tubes is 2.78 centimeter and the minimum spacing 2.4 centimeter. For this example the water flow rate per meter of electrode is 0.07 liter per second-meter.

As explained before, there may be arching or corona discharge at the support tube 27 or the spray tubes 33. The voltage should be adjusted so that the normal arcing rate is in the range between 10 and 100 arcs per minute.

Figure 11:
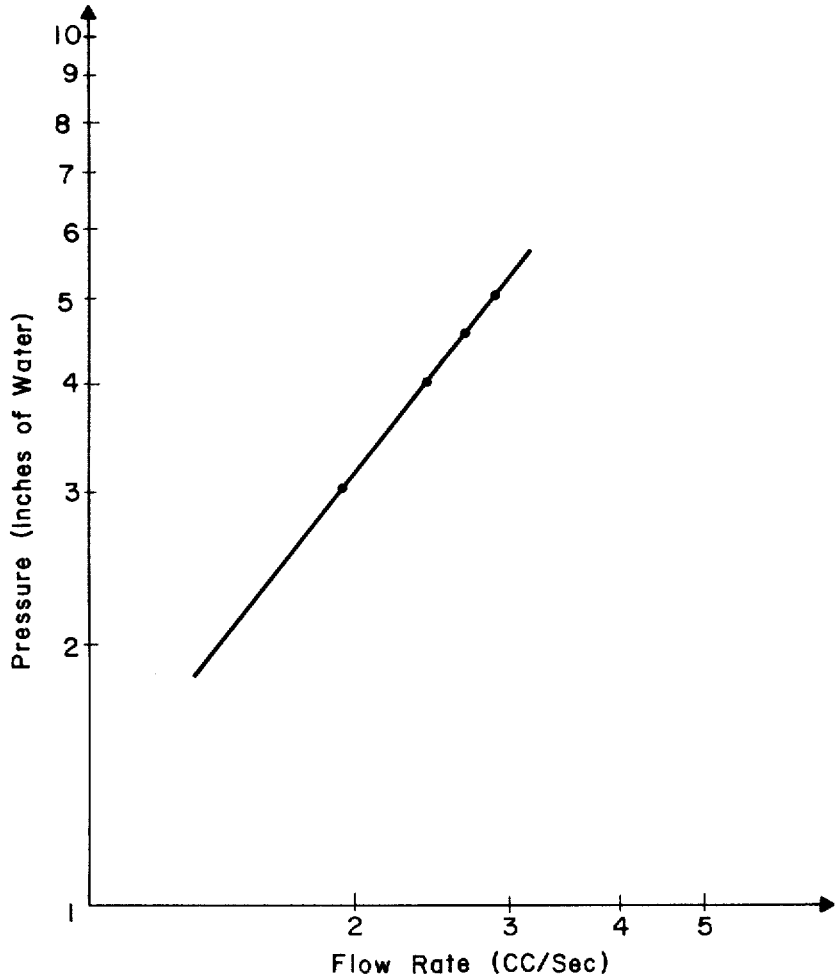
FIG. 11 is a graph showing liquid flow rate as a function of the water pressure.

FIG. 11 to which reference is now made shows a calibration between the water pressure in inches of water and the actual flow rate. This is for an 18 gauge flow tube having an outer diameter of 0.33 inch and an inner diameter of 0.05 inch. This is for a 5 tube array, that is for 5 spray tubes.

Figure 12:
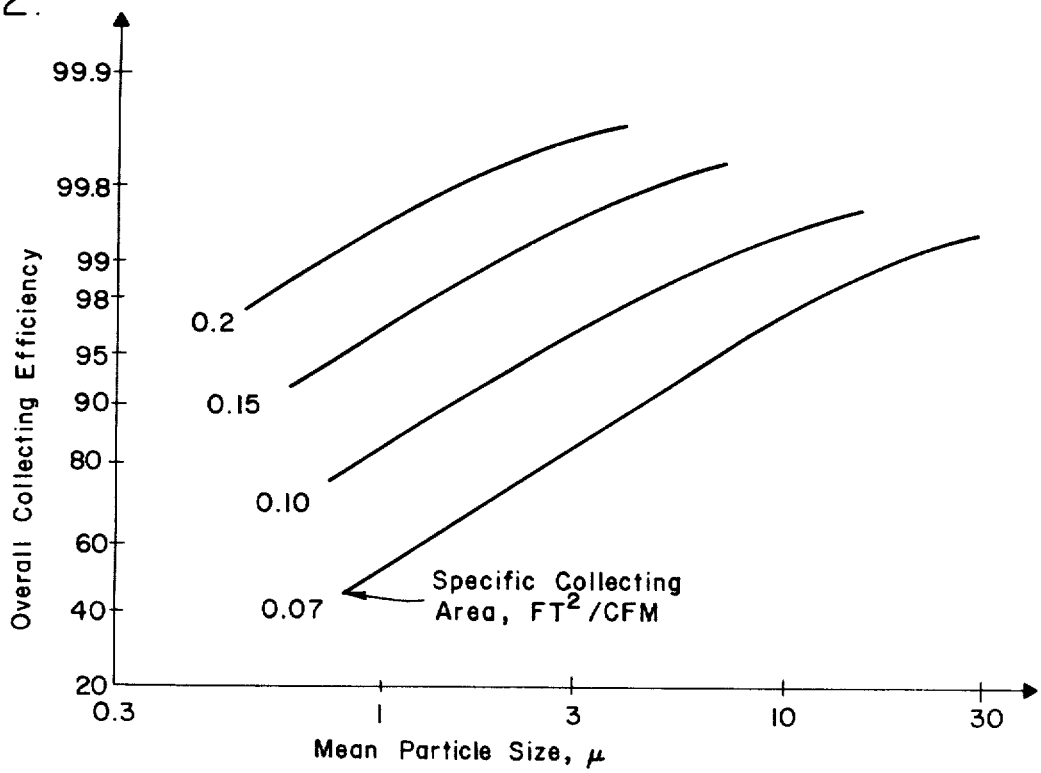
FIG. 12 is a series of curves relating the overall collector efficiency to the mean particle size for different collecting areas.

FIG. 12 shows a family of curves relating the overall collecting efficiency to the mean particle size in microns. The four curves are for specific collecting areas in square feet per cubic foot per minutes of gas between 0.2 and 0.07. For example, for a 10 micron mean particle size and a 97% efficiency, a value of the specific collecting area of 0.066 is obtaied. Basically, this figure shows the effects of particle size on the collecting efficiency as related to the specific collecting array. These curves have been obtained with a particle resistivity varying between 3 and $100\times10^9$ ohms centimeter and a positive polarity of the droplets.

Figure 13:
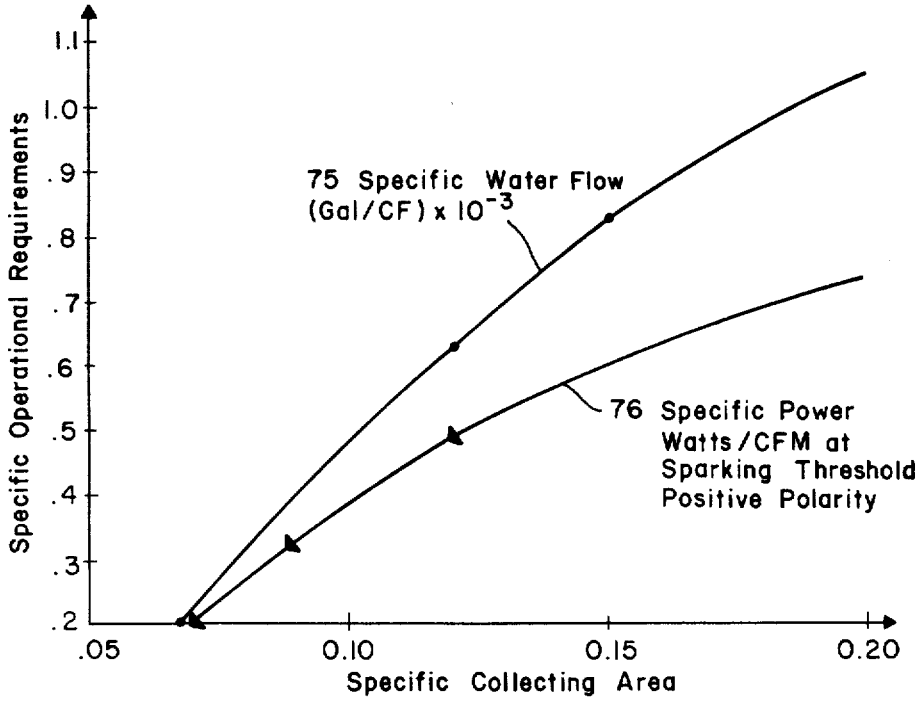
FIG. 13 shows the relationship between the required water flow and the collecting area on the one hand and the specific power requirements and the collecting area on the other hand.

Finally, FIG. 13 shows the specific collecting area with different values of the water flow and the required electric power. Thus curve 75 shows the water flow in gallons per cubic foot times $10^{-3}$ and its variation with specific collecting area. Similarly curve 76 illustrates the specific power in watts per cubic foot per minute. This is at the sparking threshold and for positive polarity. The approximate rating of the power supply at a nominal 50 kv has been estimated.

One of the experimental devices used in tests included a gas flow area having a cross-section of 1.1 square feet. The spray tubes consisted of hypodermic needles 1.5 inches long.

The needles were 22 gauge with the dimensions previously given. The tests were performed using 22 gauge needles as spray tubes and a liquid consisting of tap water. The applied voltage between the spray tubes and the walls was between 38 and 47.5 kv. The flow rate of the gas was between 5.1 and 6.8 feet per second. Tests were run with the gas at both ambient temperature and a temperature of 290° F. With a single stage unit using the parameters just given and with fly ash as the particulate matter the cleaning efficiency was 98.3% for ambient temperatures. Where the particle matter consisted of aggregate dust from an asphalt plant and at ambient temperatures the cleaning efficiency was 86%. At the elevated temperature of 290° F. the cleaning efficiency with fly ash and aggregate dust respectively was 85% and 79.7%.

There has thus been disclosed a method of removing particles and undesirable fluids from a gas stream by charged droplets. The charged droplets are generated electrohydrodynamically and hence have a high surface density charge. Undesirable fluids such as gases or condensates may also be removed, for example, by chemical action. If the gas stream contains predominantly electronegative gases, the droplets are preferably charged with positive polarity to minimize formation of ions. If some of the particles are charged the droplets are preferably charged to have the same polarity as that of the charged particles. This will minimize the possibility of reducing the surface charge of a droplet by charge neutralization. In this case neutral particles will still be absorbed and collected by the charged droplets. The method of the present invention operates without regard to the resistivity of the particles because they need not be charged.

What is claimed is:

1. The method of removing from a gas stream undesirable fluid components and particulate matter entrained thereby, by utilizing spaced, conducting elements and a spray tube disposed between the elements, the method comprising the steps of:

a. causing the gas stream to flow between the elements and past the spray tube;

b. forcing a liquid through the spray tube into the gas stream at substantially atmospheric pressure to generate a liquid jet;

c. applying a steady electric potential [of substantially 50 kilovolts to 60 kilovolts] between the liquid jet and the spaced elements[, the potential being sufficiently large] *to establish an electrostatic field at the spray tube which will verge upon the corona breakdown voltage of the gas stream in the absence of a space charge* to break up the liquid jet by the resultant electrostatic field into individual droplets having a diameter between aproximately 60 microns and approximately 250 microns, each droplet having a high surface charge density *that approaches the Rayleigh limit;* d. causing the charged droplets to flow toward the elements at an angle with respect to the direction of flow of the gas stream to provide a relative velocity between the gas stream and the droplets, whereby the droplets will collide with individual particles or undesirable fluids to remove them; and e. eventually causing the droplets to move toward the elements due to the electrostatic field where they collide and collect.

2. The method defined in claim 1 wherein the liquid jet has such a diameter and the electrostatic field has such a value that the jet is broken up into droplets having a diameter on the order of between 80 and 120 microns.

3. The method defined in claim 1 wherein the droplets are formed while moving in a generally downward direction and are then caused to move under the influence of the electrostatic field and including the step of moving the gas stream at an angle to the direction of movement of the droplets.

4. The method defined in claim 1 wherein the gas stream contains predominantly electronegative gases and wherein the electric fields is such that the droplets are charged positively, thereby to minimize the formation of ions from the gas stream.

5. The method defined in claim 1 wherein the liquid jet includes a chemical agent which will chemically react with at least one undesirable fluid of the gas stream.

6. The method defined in claim 1 wherein the viscosity of the gas stream and the magnitude of the electrostatic field are so related that the droplets move toward the elements at a substantially constant speed.

7. The method defined in claim 1 wherein a droplet is capable of multiple collisions with successive particles to collect them one by one.

8. The method of removing particulate matter entrained by a gas stream by utilizing spaced, conductive walls and a spray tube disposed between the spaced walls, the method comprising the steps of:

a. causing the gas stream to flow between the spaced walls and the spray tube;

b. ejecting a stable liquid jet from the spray tube at substantially atmospheric pressure insufficient to break up the jet into droplets;

c. applying a direct-current electric potential [of substantially 50 kilovolts to 60 kilovolts] between the spray tube and the walls, the resultant electrostatic field [being strong enough] *verging upon the corona breakdown voltage of the gas stream in the absence of a space charge* to break up the liquid jet some distance from its origin into charged droplets having a diameter between approximately 60 microns and approximately [150] *250* microns, *said droplets carrying a high surface charge density that approaches the Rayleigh limit*; and d. moving the thus formed charged droplets under the influence of the resultant electrostatic field toward the walls, whereby the droplets encounter particulate matter and remove it from the gas stream when they collide with the walls.

9. The method defined in claim 8 wherein the diameter of the particulate matter is no less than approximately 0.01 micron.

10. The method defined in claim 8 wherein the droplets are capable of supplying an electric charge by induction to the particulate matter of the same polarity as that of the droplets, whereby a thus charged particle is attracted by the electrostatic field toward the walls and is eventually removed.

11. The method defined in claim 8 wherein a plurality of closely adjacent liquid jets are generated so that the resulting droplets fill substantially the entire space between the walls, whereby the probability of a droplet encountering a particle is increased.

12. The method of removing particles entrained by a gas stream flowing between spaced, conductive walls and by utilizing a spray tube disposed between the walls, some of the particles being electrically charged and having a predetermined polarity, the method comprising the steps of:

a. causing the gas stream to flow between the spaced walls and past the spray tube, the gas stream containing both charged and uncharged particles;

b. ejecting a stable liquid jet from the spray tube at substantially atmospheric pressure insufficient to break up the jet into droplets;

c. applying a direct-current electric potential [of substantially 50 kilovolts to 60 kilovolts] between the spray tube and the walls *to establish, at the spray tube, an electrostatic field which verges upon the corona breakdown voltage of the gas stream in the absence of a space charge*, the spray tube having a polarity which is the same as that of the charged particles and the resultant electrostatic field being strong enough to break up the liquid jet some distance from its origin into droplets having a *diameter between approximately* 60 microns and approximately 250 microns, said droplets having a charge of polarity which is the same as that of the spray tube, each droplet having a high surface charge density *that approaches the Rayleigh limit* and a polarity equal to that of the particles; and d. moving the thus formed charged droplets under the influence of the electrostatic field toward the walls, whereby the droplets encounter both uncharged and charged particles, engulf the particles and remove them from the gas stream when the droplets collide with the walls, and whereby charged particles which are not so engulfed are similary moved under the influence of the electrostatic field toward the walls, and thereby removed from the gas stream.

*13. In a method where gas containing entrained fluid components or particulate matter flows between walls of a conduit in which is deposed a spray tube for injecting a liquid jet into the gas and a voltage is applied across the spray tube and conduit walls, the improvement wherein an electrostatic field is established at the surface of the tip of the spray tube which will verge upon the corona breakdown voltage of the gas stream in the absence of a space charge, to break up by electrostatic forces only the liquid jet into droplets which have a diameter between approximately* 60 microns and approximately 250 microns and which carry a high surface charge density that approaches the Rayleigh limit.

* * * * *